US009146893B1

(12) United States Patent
Garg et al.

(10) Patent No.: US 9,146,893 B1
(45) Date of Patent: Sep. 29, 2015

(54) SERVER FACILITATED CONTENT DISTRIBUTION

(71) Applicant: Amazon Technologies, Inc., Reno, NV (US)

(72) Inventors: Parag K. Garg, Woodinville, WA (US); Quais Taraki, Bellevue, WA (US); Kevin T. Weston, Jr., Redmond, WA (US)

(73) Assignee: Amazon Technologies, Inc., Reno, NV (US)

(*) Notice: Subject to any disclaimer, the term of this patent is extended or adjusted under 35 U.S.C. 154(b) by 312 days.

(21) Appl. No.: 13/685,278

(22) Filed: Nov. 26, 2012

(51) Int. Cl.
G06F 15/16 (2006.01)
(52) U.S. Cl.
CPC .................................. G06F 15/16 (2013.01)
(58) Field of Classification Search
USPC ................................................. 709/219, 203
See application file for complete search history.

(56) References Cited

U.S. PATENT DOCUMENTS

| 7,312,887 | B2* | 12/2007 | Wu | 358/1.15 |
| 2002/0026500 | A1* | 2/2002 | Kanefsky et al. | 709/219 |
| 2007/0287498 | A1* | 12/2007 | Wang et al. | 455/556.1 |
| 2010/0094976 | A1* | 4/2010 | Kanefsky et al. | 709/219 |
| 2012/0011226 | A1* | 1/2012 | Katz et al. | 709/219 |

FOREIGN PATENT DOCUMENTS

| EP | 1494417 A2 * | 1/2005 | H04L 29/06 |
| WO | WO 0244851 A2 * | 6/2002 | |
| WO | WO 2006000975 A1 * | 1/2006 | H04L 29/08 |

* cited by examiner

Primary Examiner — Kostas Katsikis
(74) Attorney, Agent, or Firm — Sutherland Asbill & Brennan LLP

(57) ABSTRACT

Described herein are systems and methods for initiating on a first device distribution and presentation of content to a second device. A server facilitates the distribution by determining a presentation context of the second device. Based at least in part on the presentation context, the server retrieves and processes the content and provides output content to the second device for presentation. A consolidated content list may also be maintained. The consolidated content list allows the user to add content for later consumption, or access the content, regardless of the content provider supplying the content.

21 Claims, 11 Drawing Sheets

SERVER FACILITATED CONTENT DISTRIBUTION

BACKGROUND

A wide variety of content is available to users for access electronically. This content may include television programming, audio books, music, movies, and so forth. The content may be delivered using broadcast, cable, satellite, networks such as the Internet, and so forth. Content provided via the Internet or another network may be streamed to a media device for presentation. During streaming, portions of the content are delivered while presentation of the content may be taking place.

Users may have a variety of devices to present the content on. Traditionally it has been problematic to present content on different destination devices which may be incompatible with a format of the content from a content provider. Furthermore, initiating presentation on another device has been cumbersome, typically requiring the user to manually select the content from the destination device itself.

Finally, each of the different content providers may maintain separate content lists, such as items queued for later presentation. Accessing the content on these content lists may be difficult in that the user may have to go to a particular service provider, retrieve the list, and so forth.

Figure 1:
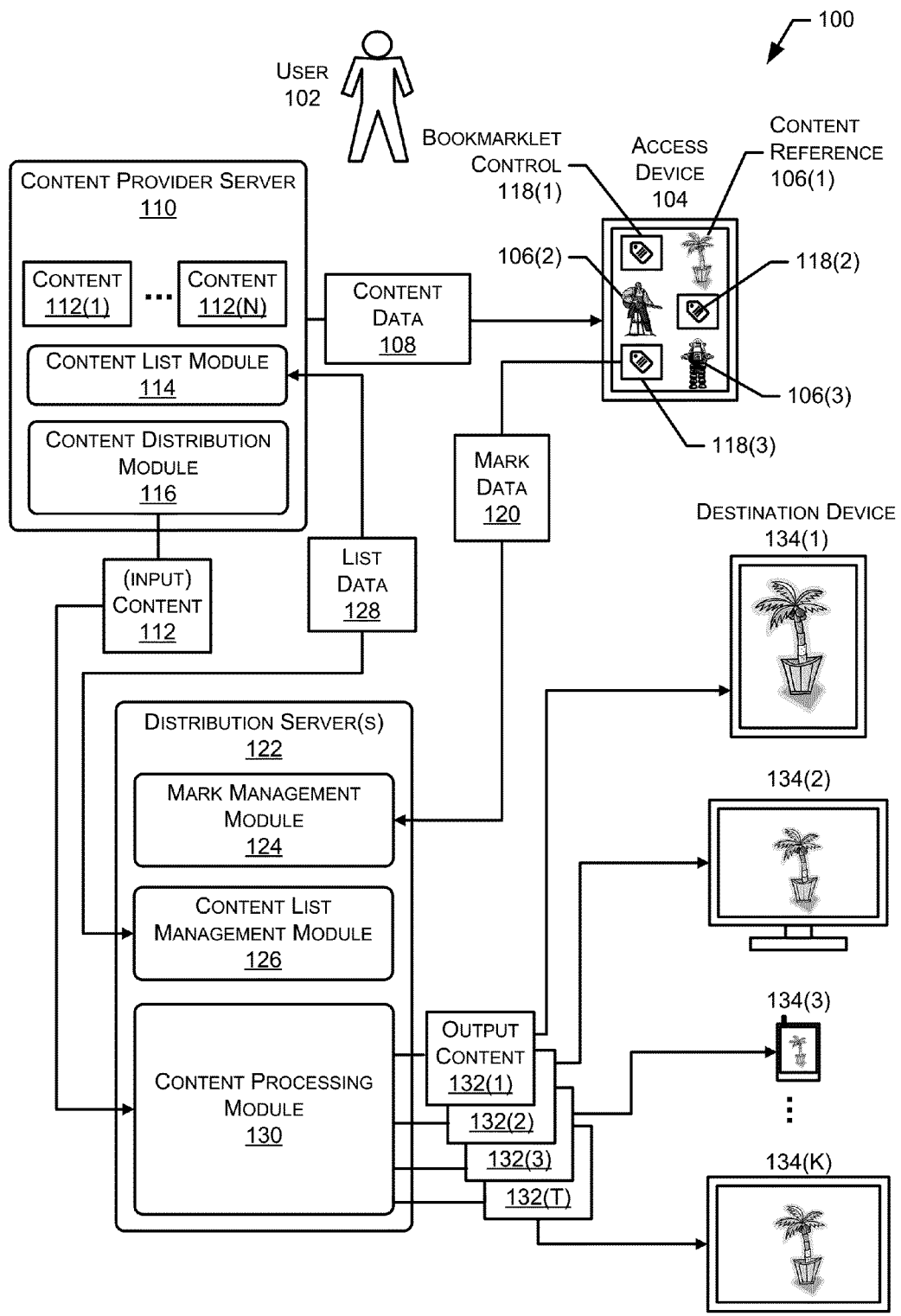
FIG. 1 illustrates a system for server facilitated content distribution.

Certain implementations will now be described more fully below with reference to the accompanying drawings, in which various implementations or aspects are shown. However, various aspects may be implemented in many different forms and should not be construed as limited to the implementations set forth herein. Like numbers refer to like elements throughout.

DETAILED DESCRIPTION

A vast and ever growing collection of content is available for users to access. This content may include television programming, audio books, music, movies, and so forth which may be streamed from a content provider over a data network such as the Internet to a device for presentation. Users may access this content from a variety of different devices ranging from tablets, smartphones, televisions, in-vehicle entertainment systems, game consoles, portable computers, desktop computers, and so forth. A user may come across content of interest while using a first device, but may wish to consume that content on a second device. For example, the user may find a link to a video of interest while using a smartphone, but chooses to watch the video on the television. The user may also wish to save that content for later, or repeated, consumption.

Described in this disclosure are devices and methods for facilitating content distribution with a server. A user may find content of interest, or links to content of interest, using a first or access device which receives content data from a content provider server. The user may activate a bookmarklet or other function on the access device to send mark data indicative of the content to a distribution server. The bookmarklet may be configured to cause the distribution server to present the content on a second or destination device, enter the content onto a content list for later presentation, or both.

The content from the content provider may be in a format which is incompatible with presentation on the destination device. The format of a piece of content includes data encoding scheme used, sample rate, frame rate, color depth, resolution, bit rate, compression used, encryption used, and so forth. For example, the content provider may provide the content in an MPEG-4 format while the destination device may only be capable of displaying MPEG-2 format. In another example, the content provider may provide the content a format using MPEG-4 encoding with image resolution of 1920×1080 pixels and multichannel audio format while the destination device may only be capable of presenting a format where the MPEG-4 encoded images have a maximum resolution of 1920×720 and two channels of audio. In traditional systems, the content would either be unavailable for presentation on the destination device, or some additional intervention such as installation of additional codecs would be required to enable presentation of the content. As described herein, the distribution server may process the content from a first format supplied by the content provider to a second format compatible with the second device for presentation. This processing may include decryption, transcoding, transrating, transsizing, and so forth. As a result, the user may easily and seamlessly initiate presentation of content on a variety of different destination devices.

Each of the content providers may maintain individual content lists associated with user accounts. The content lists provide a storage location for data indicating one or more pieces of content which the user wishes to consume. Traditionally these lists have been isolated, such that a user searching for a particular piece of content on a content list would need to log into each content provider for which they have an account. As described below, the distribution server may maintain a consolidated content list which combines data indicative of content from several content providers. Using this functionality, the user may maintain and use a single consolidated content list which includes content from multiple content providers. This improves the user experience and ability to consume content without having to access the various content providers.

The overall user experience of consuming content is improved by the distribution server's handling of the content which enables the user to easily select and present a wide array of content on a wide array of devices. Furthermore, the ability to maintain and use the consolidated content list allows the user to easily store and consume content, regardless of the content provider which supplies the content. Instead of fussing with installation of codecs to present content or looking through the lists of content on several content providers, the user may simply enjoy the content.

Illustrative System

FIG. 1 illustrates a system 100 for server facilitated content distribution between devices. A single user 102 is shown, however more than one user 102 may consume presented content at a given time. For example, several users 102 may watch a movie or television show together.

One or more devices are depicted, including an access device 104. The access device 104 may comprise a television, a set-top box, a tablet computer, a smartphone, an in-vehicle entertainment system, a laptop computer, a desktop computer, and so forth. The access device 104 is configured to present one or more content references 106 to the user 102. The presentation may include visual presentation on a display, audio presentation using a speaker, and so forth. The content references 106 may be icons, graphics, links, or other indicators which are based at least in part on content data 108. The content data 108 may be received from one or more content provider servers 110(1), 110(2), . . . , 110(P) maintained by a content provider. The content provider server 110 may store one or more pieces of content 112(1), 112(2), . . . , 112(N) for presentation to the user 102. The content data 108 is information which is indicative or descriptive of the content 112. In some implementations the content data 108 may include references to the content 112. These references may include a link or address which, when processed by a device may cause presentation of the content 112.

The content provider server 110 may also include a content list module 114. The content list module 114 is configured to store a content list comprising data indicative of one or more pieces of content 112 which the user 102 or another party has stored for consumption.

The content provider server 110 includes a content distribution module 116. The content distribution module 116 is configured to provide at least a portion of the content 112 in one or more formats to an external device. The content distribution module 116 may be configured to send the content 112 or a portion thereof prior to presentation, to stream portions of the content 112, or a combination thereof.

Returning to the access device 104, the access device 104 may also present one or more bookmarklet controls 118(1), 118(2), . . . , 118(B). The bookmarklet control 118 may comprise a script or bookmark which is stored on a web page delivered to the access device 104, or within a bookmark stored locally on the access device 104. For example, the bookmarklet 118 may execute a script by a browser using a web browser engine executing on the access device 104. The bookmarklet control 118 is configured to, upon receiving user input from the user 102, generate mark data 120. In some implementations a different bookmarklet control 118 may be associated with a particular content reference 106. For example, the content reference 106(1) which refers to a video about how to plant a coconut palm may be associated with the bookmarklet control 118(1). Upon activation of the bookmarklet control 118(1), mark data 120(1) associated with the content reference 106(1) may be generated.

The mark data 120 comprises information indicative of the content data 108 or the content 112 presented on the access device 104. For example, the mark data 120 may include information such as a uniform resource identifier or uniform resource locator provided in the content data 108 which refers to the content 112 as associated with the content reference 106. In another example, the user 102 may be watching on the access device 104 a portion of the content and activate the bookmarklet control 118 to generate the mark data 120.

The mark data 120 may include information associated with the content data 108, the user 102, and an action to be taken. The information may include one or more of user account identification associated with the user 102 of the access device 104, content identifier referring to the content 112, designation of a destination device, request to add the content 112 to a content list, and so forth. For example, the activation of the bookmarklet control 118 may present the user 102 with a user interface on the access device 104 which prompts for a destination device to cause presentation on of the associated content 112.

The mark data 120 is received by one or more distribution servers 122(1), 122(2), . . . , 122(D). The distribution server 122 may comprise a mark management module 124, a content list management module 126, and a content processing module 130. In some implementations, the mark data 120 may comprise a hypertext markup language (HTML) or extensible markup language (XML) file.

The mark management module 124 is configured to accept and process the mark data 120 received from one or more of the access devices 104. The mark data 120 may be used to indicate that one or more pieces of content 112 are to be added to a consolidated content list, processed for presentation on a device, or both. The mark management module 124 is described in more detail below with regard to FIG. 4.

The content list management module 126 is configured to allow the user 102 to manage a consolidated list of content associated with the user 102, the access device 104, or both. In some implementations the content list management module 126 may be configured to access the content list module 114 or content lists of one or more content provider servers 110 to exchange list data 128.

The list data 128 comprises information indicative of one or more pieces of content 112. The list data 128 may include one or more a content title, a rating of the content 112, a graphic associated with the content 112, a content identifier configured to allow retrieval of the content 112 from the content provider server 110, and so forth.

The content list management module 126 may add or remove content 112 to the consolidated list based at least in part on the mark data 120, the list data 128 or other user inputs received from the user 102 or other modules. The content list management module 126 is described in more detail below with regard to FIG. 4.

The content processing module 130 is configured to process input content 112 supplied by the content provider server 110 and generate output content 132 for distribution to one or more destination devices 134(1), 134(2), . . . , 134(K). The content processing module 130 may receive data indicative of one or more pieces of content 112 for processing from the mark management module 124, the content list management module 126, and so forth. For example, the mark management module 124 may receive the mark data 120(1) indicating that the user 102 has selected the content 112(1) which is indicated by content reference 106(1) on the access device 104 is to be presented on the destination device 134(1). In another example, the user 102 may select for presentation one of the pieces of content referenced in the consolidated content list maintained by the content list management module 126.

The processing to be applied to the content 112 by the content processing module 130 is configured to enable or facilitate presentation of the resulting output content 132 on the destination device 134. In one implementation, the processing may comprise transcoding content. For example, the content 112 may be supplied from the content provider server 110 in a first format, such as video in the MPEG-4 format as promulgated by the Motion Picture Experts Group. Continuing the example, the destination device 134 may lack the necessary hardware or software to present the MPEG-4 format, instead only being able to support the MPEG-2 format. The content processing module 130 may be configured to transcode the supplied input content 112 from MPEG-4 into output content 132 in the MPEG-2 format. This output content 132 may be provided to the destination device 134, allowing the destination device to present the content 112 (or a representation thereof). The content processing module 130 and its operation is discussed in more depth below with regard to FIG. 4.

The output content 132 is based at least in part on the input content 112. In some implementations, the output content 132 may be provided in an output format which differs from an input format of the input content 112. For example, video content 112 may have the video removed during processing and only the audio track associated with the video may be provided in the output content 132 where the destination device 134 lacks a display device.

The destination devices 134 may include one or more tablets, smartphones, televisions, in-vehicle entertainment systems, game consoles, portable computers, desktop computers, and so forth. The destination devices 134 may act as access devices 104, and vice versa. The designation of "access device" and "destination device" is used in this disclosure for illustration, and not by way of limitation. Furthermore, the access device 104 and the destination devices 134 (1)-(K) may be present at the same location or different locations. The devices may be used or accessed by different users. For example, the user 102(1) may use the access device 104 while at work to initiate presentation of content 112(1) on the destination device 134(2) which is located at home and being watched by the user 102(2).

The access device 104, the content provider server 110, the distribution server 122, and the destination device 134 may use one or more network interfaces to communicate with one another using one or more networks coupled to those network interfaces. The networks may comprise one or more private networks, public networks such as the Internet, or a combination of both configured to transfer data between two or more devices.

Figure 2:
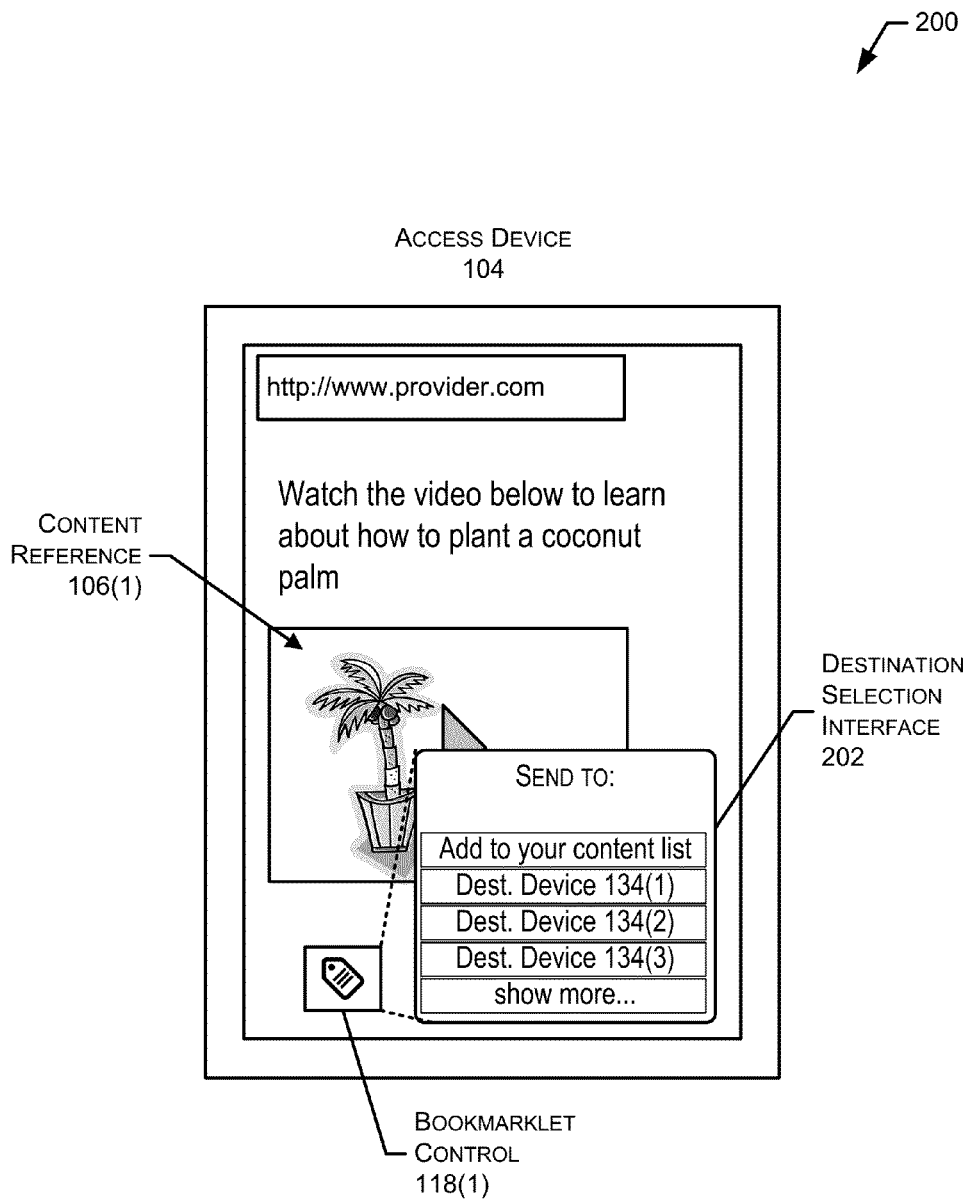
FIG. 2 illustrates an access device user interface for initiating presentation of content on a destination device or adding the content to a content list for later consumption.

FIG. 2 illustrates an access device user interface 200 for initiating presentation of content on the destination device 134 or adding the content to a content list for later consumption. In some implementations the user interface 200 may be generated by rendering one or more HTML files on a rendering engine executing at least in part on the access device 104.

In this user interface the content reference 106(1) is depicted. Here, the content reference 106(1) comprises an indication of video content which is available for playback. As described above, the content reference 106 may comprise icons, graphics, links, or other indicators of content 112 which are based at least in part on content data 108. In some implementations the content reference 106 may include presentation of the content 112. For example, the web page may include video which automatically begins playing.

Also illustrated is the bookmarklet control 118(1) corresponding to the content reference 106(1). The user 102 may activate the bookmarklet control 118(1) by various user inputs such as touching on a touch screen, clicking with a mouse, pressing a key on a keyboard, selecting from a menu, and so forth. Upon activation, the bookmarklet control 118 may be configured to send the mark data 120 to the distribution server 122.

In some implementations, the bookmarklet control 118 may activate a destination selection interface 202. The user 102 may use the destination selection interface 202 to generate data indicative of a particular action which the user 102 desires the distribution server 122 to take after receipt of the mark data 120.

The destination selection interface 202 may present options to the user such as "add to your content list" or indicate several different destination devices 134(1)-(K). Based at least in part on user input responsive to the destination selection interface 202, the mark data 120 may include information indicative of the selection. For example, the mark data 120 may include information which indicates the user 102 has selected to add the content to the user's 102 consolidated content list maintained by the content list management module 126, present the content 112 on the destination device 134(2), or both.

In some implementations the bookmarklet control 118 may not be specific to, or associated with, a particular content reference 106. Thus, activation may provide mark data 120 which includes references to more than one piece of content 112. For example, where the user interface 200 includes three pieces of content and the bookmarklet control 118 is implemented as a bookmark, the mark data 120 associated with activation may include information about all three pieces of content 112(1)-(3). The mark management module 124 may be configured with a default action, such as adding the content 112 to the content list and processing the content 112 with the content processing module 130 in order to deliver output content 132 to a default device 134.

Figure 3:
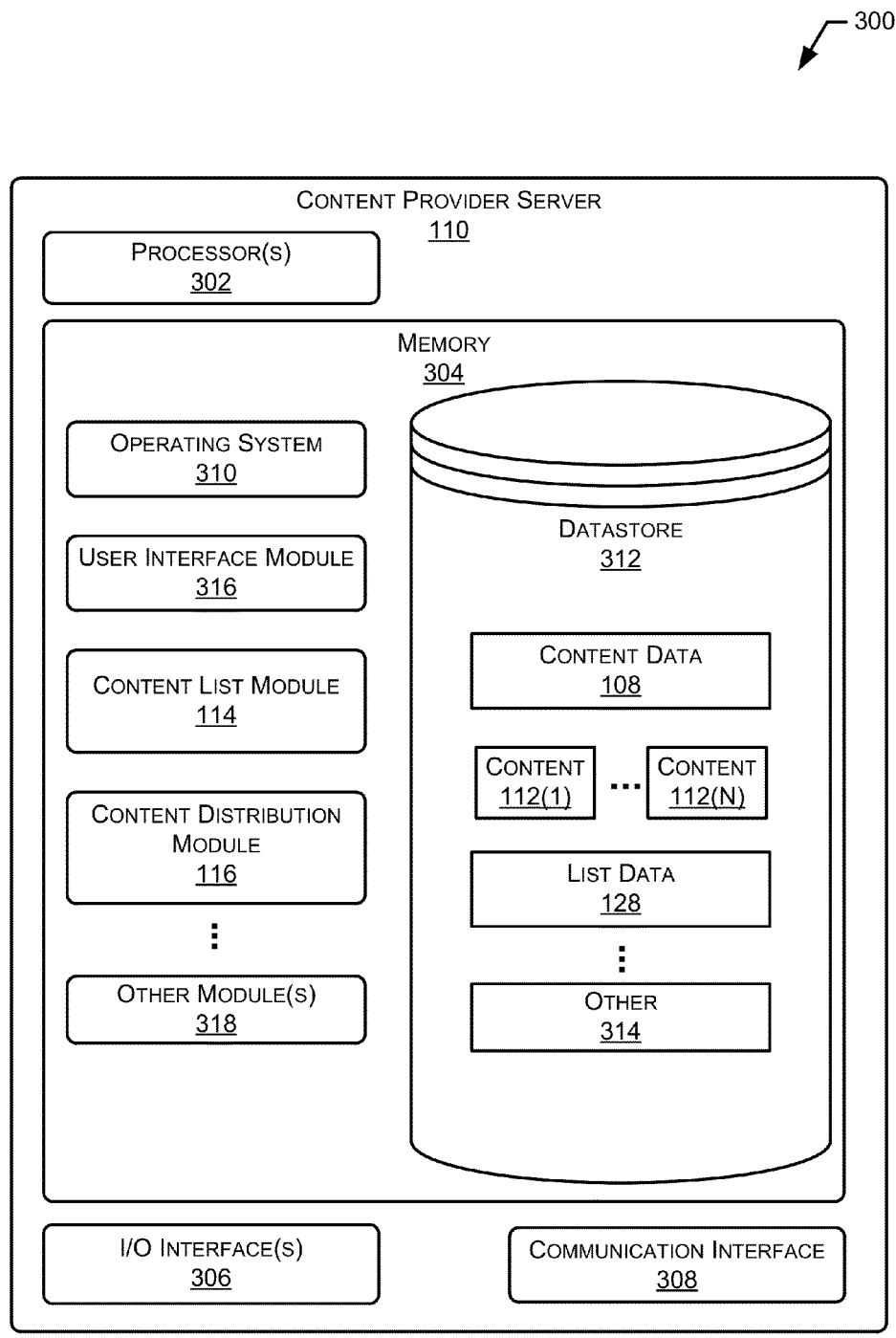
FIG. 3 illustrates a block diagram of a content provider server configured to provide content for presentation.

FIG. 3 illustrates a block diagram 300 of the content provider server 110 configured to provide content 112 for presentation. The content provider server 118 may comprise one or more processors 302, one or more memories 304, one or more input/output ("I/O") interfaces 306, and one or more communication interfaces 308.

The processor 302 may comprise one or more cores and is configured to access and execute at least in part instructions stored in the one or more memories 304. The one or more memories 304 comprise one or more computer-readable storage media ("CRSM"). The one or more memories 304 may include, but are not limited to, random access memory ("RAM"), flash RAM, magnetic media, optical media, and so forth. The one or more memories 304 may be volatile in that information is retained while providing power or non-volatile in that information is retained without providing power.

The one or more I/O interfaces 306 allow for coupling I/O devices to the content provider server 118. The I/O interfaces 306 may comprise inter-integrated circuit ("I2C"), serial peripheral interface bus ("SPI"), universal serial bus ("USB"), RS-232, RS-432, and so forth.

The one or more communication interfaces 308 provide for the transfer of data between the content provider server 118 and other devices such as the access device 104, the distribution server 112, the destination device 134, and so forth. The communication interfaces 308 may be configured to connect the content provider server 118 wired or wirelessly to one or more networks, such as the Internet.

In other implementations other devices or components may be coupled to or incorporated within the content provider server 118. For example, digital rights management ("DRM") devices may be provided to control access to content.

The one or more memories 304 may store code or program instructions for execution by the processor 302 to perform certain actions or functions. In some implementations at least a portion of the instructions may be stored in external memory accessible to the content provider server 118, such as on another content provider server 118.

These instructions in the one or more memories 304 may include an operating system 310. The operating system 310 is configured to manage hardware resources such as the I/O interfaces 306 and provide various services to applications executing on the processor 302.

The one or more memories 304 may also store a datastore 312 containing information. This information may include the content data 108, one or more pieces of the content 112 (1)-(N), the list data 128, and other data 314. The other data 314 may include user account information which contain information associated with one or more of the users 102(1), 102(2), . . . , 102(U), digital rights management keys, billing information, and so forth. While the datastore 312 is depicted as residing in the memory 304 of the content provider server 118, in some implementations at least a portion of the data in the datastore 312 may be stored on or distributed across one or more other servers 118 or other devices. The datastore 312 may comprise a database, flat file, linked list, or other data structure.

Stored in the memory 304 may be the user interface module 316 which is configured to provide a user interface for presentation to the user 102. For example, the user interface module 316 may provide one or more web pages configured to accept input from the user 102. The user interface module 316 may be configured to provide a graphical user interface in which the user 102 can select content for presentation. In some implementations other interfaces may be provided, such as an application programming interface or other device-to-device interface to facilitate interaction between the content provider server 110 and other devices such as the access device 104, the distribution server 122, the destination devices 134, and so forth.

The memory 304 may also include the content list module 114. As described above, the content list module 114 is configured to store and maintain a content list comprising data indicative of one or more pieces of content 112 which the user 102 or another party has stored for consumption. For example, the user 102 may have added particular pieces of content 102 to the content list for later consumption.

The memory 304 may also store the content distribution module 116. As described above, the content distribution module 116 is configured to provide at least a portion of the content 112 in one or more formats to an external device.

The format of content indicates how content is represented as data, and the arrangement of that data. The format may be defined by an encoding scheme used, encoding bandwidth, image resolution, and so forth. A particular piece of content 112 may be available in several different formats from one or more content provider servers 110. For example, the same piece of content 112(1) may be available in a standard definition 480p version and a high definition 1080p version, while both are encoded using the MPEG-4 encoding scheme. Different formats may require different hardware or software for presentation. Hardware may include dedicated hardware decoders, while software may include software decoders or codecs.

The content distribution module 116 may be configured to send the content 112, or a portion thereof, prior to presentation. For example, a single music track may be delivered as a single MP3 file prior to presentation. The content distribution module 116 may also be configured to stream the content 112, where presentation takes place while portions of the content 112 continue to be delivered.

Other modules 318 may also be stored in the memory 304. For example, a billing module may be configured to accept and process payment information to provide access to the content 112.

Figure 4:
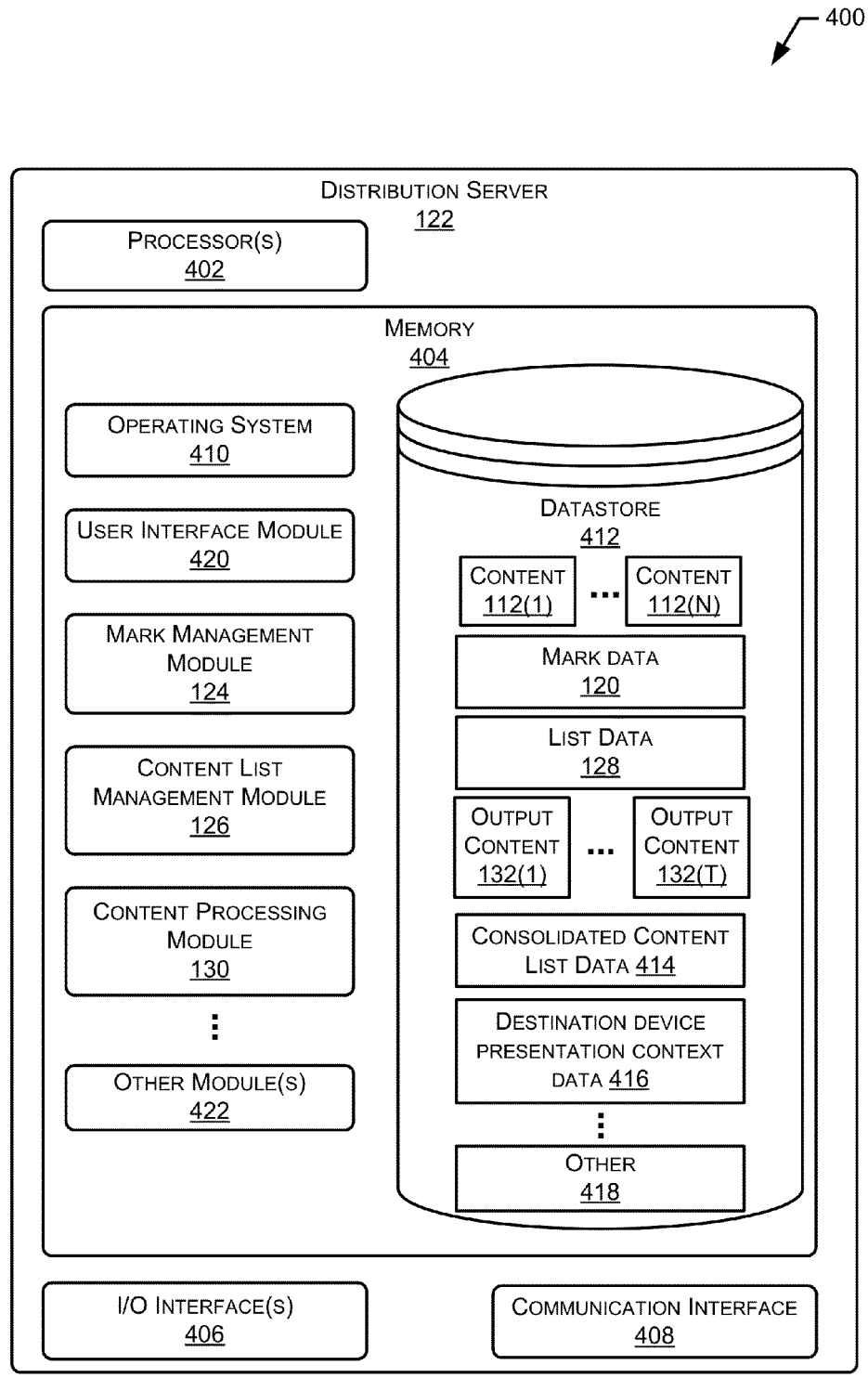
FIG. 4 illustrates a block diagram of a distribution server with a content processing module configured to process content for presentation on a destination device.

FIG. 4 illustrates a block diagram 400 of the distribution server 122. The distribution server 122 may comprise one or more processors 402, one or more memories 404, one or more I/O interfaces 406, and one or more communication interfaces 408.

The processor 402 may comprise one or more cores and is configured to access and execute at least in part instructions stored in the one or more memories 404. The one or more memories 404 comprise one or more CRSM such as described above.

The one or more I/O interfaces 406, similar to those described above, allow for coupling I/O devices to the distribution server 122. The I/O interfaces 406 may comprise I2C, SPI, USB, RS-232, RS-432, and so forth. The I/O devices may include keyboards, external memory, printers, and so forth.

The one or more communication interfaces 408 provide for the transfer of data between the distribution server 122 and other devices such as the access device 104, the content provider server 110, the destination devices 134, and so forth. The communication interfaces 408 may include, but are not limited to, PANs, LANs, WLANs, WWANs, and so forth.

In other implementations other devices or components may be coupled to or incorporated within the distribution server 122. For example, digital rights management ("DRM") devices may be provided to control access to content.

The one or more memories 404 may store code or program instructions for execution by the processor 402 to perform certain actions or functions. In some implementations at least a portion of the instructions may be stored in external memory accessible to the distribution server 122.

These instructions in the one or more memories 404 may include an operating system 410. The operating system 410 is configured to manage hardware resources such as the I/O interfaces 406 and provide various services to applications executing on the processor 402.

The one or more memories 404 may also store a datastore 414 containing information. This information may include one or more of the content 112, the mark data 120, the list data 128, or the output content 132. Consolidated content list data 414, destination device presentation context data 416, and other data 418 may also be stored in the datastore 412. The consolidated content list data 414 is discussed below in more detail with regard to the mark management module 124 while the destination device presentation context 416 is discussed below in more detail with regard to the content processing module 130. The datastore 414 may comprise a database, flat file, linked list, or other data structure.

Other data 418 may also be stored in the datastore 412, such as digital rights management keys, billing information, and so forth. While the datastore 412 is depicted as residing in the memory 404 of the distribution server 122, in some implementations at least a portion of the data in the datastore 412 may be stored on or distributed across one or more of the distribution servers 122 or other devices.

The memory 404 may store one or more of a user interface module 420, the mark management module 124, the content list management module 126, or the content processing module 130. The user interface module 420 may be configured to provide a user interface for presentation to the user 102. For example, the user interface module 420 may provide one or more web pages configured to accept input from the user 102 for viewing the consolidated content list data 414. In some implementations other interfaces may be provided, such as an application programming interface or other device-to-device interface to facilitate interaction between the content provider server 110 and other devices such as the access device 104, the content provider servers 110, the destination devices 134, and so forth.

The mark management module 124 is configured to accept and process the mark data 120 from one or more of the access devices 104. The mark management module 124 may be configured to parse incoming mark data 120, and based at least in part on the mark data 120, initiate one or more actions in the other modules of the distribution server 122. For example, receipt of the mark data 120 which includes data to add a piece of content 112 to the user's 102 associated consolidated content list data 414 may result in sending the identification of the content 112 and the user account associated with the user 102 to the content list management module 126. In another example, receipt of the mark data 120 which includes a designation of a destination device may result in sending the content identification and the destination device information to the content processing module 130.

The content list management module 126 is configured to maintain the consolidated content list data 414 which provides a content list associated with a particular user account associated with the user 102. The user 102 may create a user account and request that the content lists present on one or more content provider servers 110 be retrieved as the list data 128 and merged to form the consolidated content list data 414. In some implementations the content list management module 126 may be configured to push list data 128 to one or more of the content provider servers 110.

The consolidated content list data 414 comprises information indicative of one or more pieces of content 112. The consolidated content list data 414 may include one or more of a content provider identifier, content identifier indicative of the particular piece of the content 112, or the content data 108. The content provider identifier is indicative of a particular content provider or content provider server 110 associated with the particular content provider. In some implementations, the content identifier may include a uniform resource identifier or uniform resource locator which comprises a deep link, such that the deep link is indicative of the content provider and the particular piece of content 112.

The content list management module 126 may provide the consolidated content list data 414, or a portion thereof, to the user 102. For example, the user interface module 420 may provide web pages which allow the user 102 to login, review content items on the list, and initiate presentation on one or more of the destination devices 134.

The content processing module 130 is configured to process input content 112 received from the content provider server 110 and generate output content 132 for distribution to one or more destination devices 134(1), 134(2), . . . , 134(K).

The processing may include decrypting, transcoding, transrating, transsizing, adapting, or otherwise altering the content in such a fashion as to provide output content 132 which is operable to be presented on the destination device 134. Decrypting is removing encryption such as a digital rights management ("DRM") scheme. Transcoding is the process of converting data from a first encoding scheme to a second encoding scheme. For example, video data may be converted from MPEG-2 to MPEG-4. Transrating processes the content in such a way that the encoding scheme is retained while the bit rate changes. For example, audio content encoded at a bit rate of 128 kilobits per second may be transrated down to a 64 kilobit per second bit rate. Transsizing processes the content to scale or change from a first image size to a second image size. For example, video content which is encoded in 720p may be transsized to upscale to 1080p for presentation on a corresponding 1080p device. Other alterations such as converting black-and-white images to color, color images to black-and-white, and so forth may also be provided.

The content processing module 130 may be configured to determine what processing to apply to the content 112 based at least in part on the destination device presentation context data 416. The destination device presentation context data 416 ("presentation context data 416") provides information which is indicative of the destination device 134 which is to present the output content 132. The presentation context data 416 may include device characteristics such as display hardware, content characteristics such as whether the content is video or audio, user preferences such as audio equalizer settings, and so forth. The destination device presentation context data 416 is discussed in more detail below with regard to FIG. 7. For example, as described below, the presentation context data 416 may include information that the destination device 134 supports a 1920×1080 display resolution, has a hardware decoder for MPEG-2 available, and so forth.

The content processing module 130 uses the presentation context data 416 to determine what format the destination device 134 requires in order to present the output content 132. Once determined, the content processing module 130 may generate output content 132 which is consumable by the destination device 134. For example, the content provider server 110 may provide the content 112(1) in a format comprising standard definition video of 480p encoded with MPEG-4. The user 102 may use the access device 104 to send mark data 120(1) requesting presentation of the content 112(1) on the destination device 134(1). The content processing module 130 may determine from the presentation context data 416 associated with the destination device 134(1) that the destination device 134(1) has a display with a native resolution of 1080p, only accepts MPEG-2 encoded data, and does not support hardware upscaling of video content. Based at least in part on this presentation context data 416, the content processing module 130 may be configured to generate output content 132(1) in which the content 122(1) is transcoded into MPEG-2 and upscaled to 1080p. The output content 132(1), now in a content which is operable by the destination device 134(1) to present, may then be presented to the user 102. From the user's 102 point of view, they activated the bookmarklet control 118(1), perhaps selected the destination device 134(1) if not previously set as a default, and were able to see the content 112(1) presented on the destination device 134.

The content processing module 130 may apply other forms of processing. In one implementation, the content processing module 130 may add or remove of borders such as windowboxes, letterboxes, pillarboxing, and so forth based at least in part on the presentation context data 416. In another implementation captions may be added by content processing module 130. For example, closed captions may be added to a video stream. The content processing module 130 may use machine or human translation to provide captions or additional audio, allowing the user 102 to experience content which is in a language unknown to the user 102. For example, the user 102 may select content 112 which is in German which is processed into output content 132 with English subtitles or computer-generated English audio.

The content processing module 130 may also be configured to apply content filters such that the output content 132 is a subset of the input content 112. For example, the user 102(1) parent may activate a content filter. During processing, words present in the content 112 which are indicated in a profanity list are removed from the output content 132 which is presented on the destination device 134(2) to the user 102(2) child.

The processing applied by the content processing module 130 may also include, but is not limited to, adjusting image settings, sharpening images, modifying audio, adding transitions between pieces of content 112, and so forth.

Other modules 422 may also be stored in the memory 404. For example, a digital rights management module may be configured to apply digital rights management techniques to the output content 132.

Figure 5:
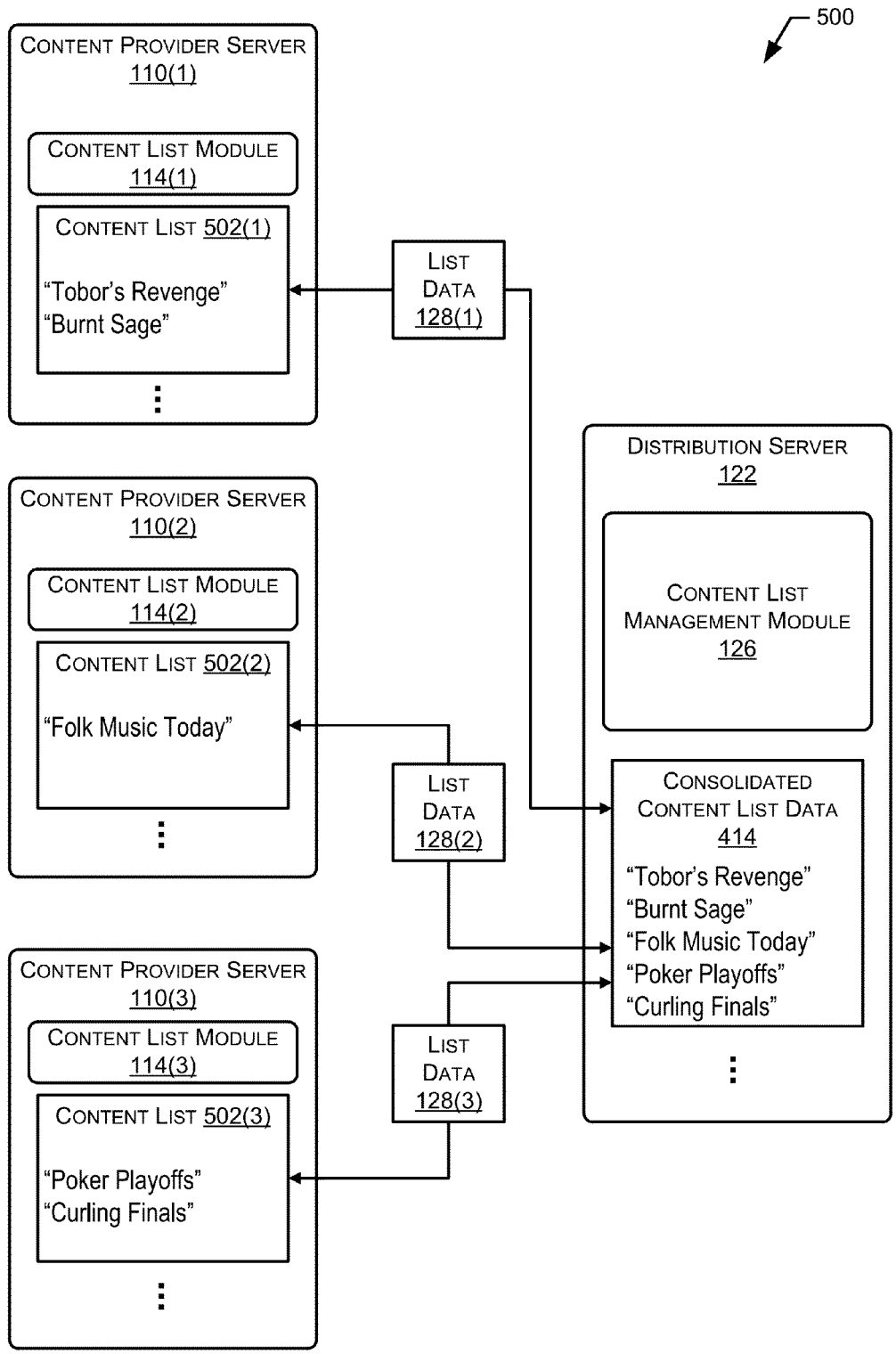
FIG. 5 illustrates a block diagram of consolidated content list data based on list data from different content providers.

FIG. 5 illustrates a block diagram 500 of consolidated content list data 414 based on list data 128 from different content provider servers 110 maintained by different content provider entities. As described above, the content list management module 126 may exchange data with the content list modules 114 of one or more of the content provider servers 110. This allows the generation of the consolidated content list data 414 associated with a particular user account associated with the user 102. The consolidated content list data 414 allows the user 102 to see in one interface content which has been selected for later presentation, regardless of which content provider is supplying the content.

In this illustration three content provider servers 110(1)-(3) are depicted, each associated with a different content provider entity. Each of the content provider servers 110 shown here are associated with a different content provider. The user 102 may have different user accounts with each of these content providers. A content list 502 for each of the content providers indicates content which the user 102 or another party has designated for later consumption by the user 102.

Over time, the user 102 has added different pieces of content 112 to content lists 502 of each of the content providers. In this illustration content list 502(1) on the content provider server 110(1) includes the content 112 titles "Tobor's Revenge" and "Burnt Sage." Meanwhile the content provider server 110(2) holds content list 502(2) with the content 112 title "Folk Music Today." Likewise, the content provider server 110(3) holds content list 502(3) which includes the content 112 titles "Poker Playoffs" and "Curling Finals."

The content list management module 126 may be configured to access the content lists 502 associated with the user 102 and generate the consolidated content list data 414. The list data 128(1)-(3) may be retrieved by the distribution server 122 from the content list modules 114(1)-(3) on the content provider servers 110(1)-(3). The list data 128 may be processed and used to create the consolidated content list data 414. The consolidated list data 414 may then be presented, within which the content titles are presented and available. The user 102 may access this single list, and select content for presentation. Once selected for presentation, the content 112 may be supplied by the respective content provider server 110. In some implementations, the content processing module 130 may be used to process the content 112 into the output content 132 as described above.

Figure 6:
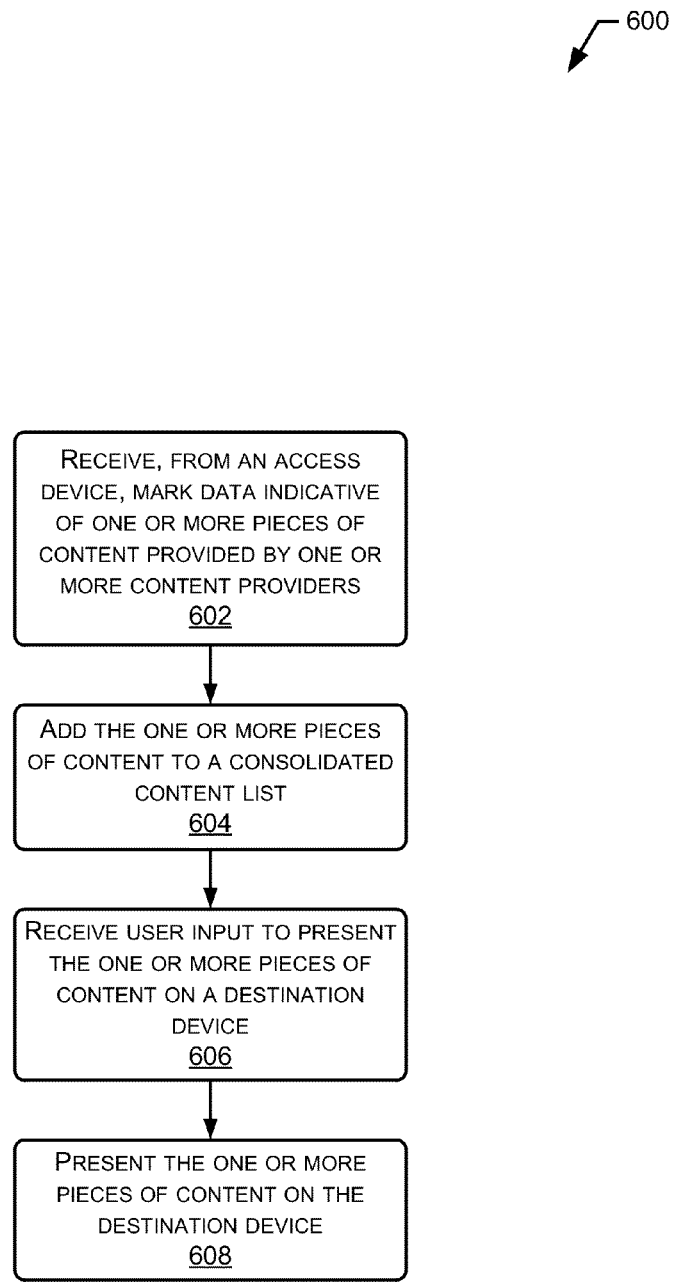
FIG. 6 illustrates a flow diagram of generating the consolidated content list data.

FIG. 6 illustrates a flow diagram 600 of generating the consolidated content list data 414. The process may be implemented at least in part by one or more of the content list management module 126 on the distribution server 122.

Block 602 receives, from the access device 104, the mark data 120. As described above, the mark data 120 is indicative of one or more pieces of content 112 provided by one or more content providers from the content provider servers 110. For example, the user 102 may activate the bookmarklet control 118 for the content "Tobor's Revenge."

The bookmarklet control 118 may be configured to add content which is currently being presented on the access device 104 or one of the destination devices 134. In some implementation the bookmarklet control 118 may be configured to access information from one or more sensors of the access device 104 and use this to determine the content 112 to add to the consolidated content list data 414. For example, a microphone and global positioning system receiver may be used to acquire audio and position information, respectively. Based at least in part on this information the system 100 may determine that the user 102 is at a recording of the radio show "Folk Music Today" and thus generate the mark data 120 for the content 112 resulting from the recording.

Block 604 adds the one or more pieces of content 112 to the consolidated content list data 414. For example, data indicating the content 112 "Tobor's Revenge" and "Folk Music Today" may be added to the list.

Block 606 receives user input to present the one or more pieces of content 112 on the destination device 134. For example, the user 102 may use the user interface presented by the user interface module 420 to select the presentation of "Tobor's Revenge" on the destination device 134(2).

Block 608 causes presentation of the one or more pieces of content 112 on the destination device 134. For example, the content 112 "Tobor's Revenge" may begin playing on the destination device 134(2). Prior to presentation, in some implementations the content may be processed by the content processing module 130 of the distribution server 122. This processing is discussed below with regard to FIGS. 7-10.

Figure 7:
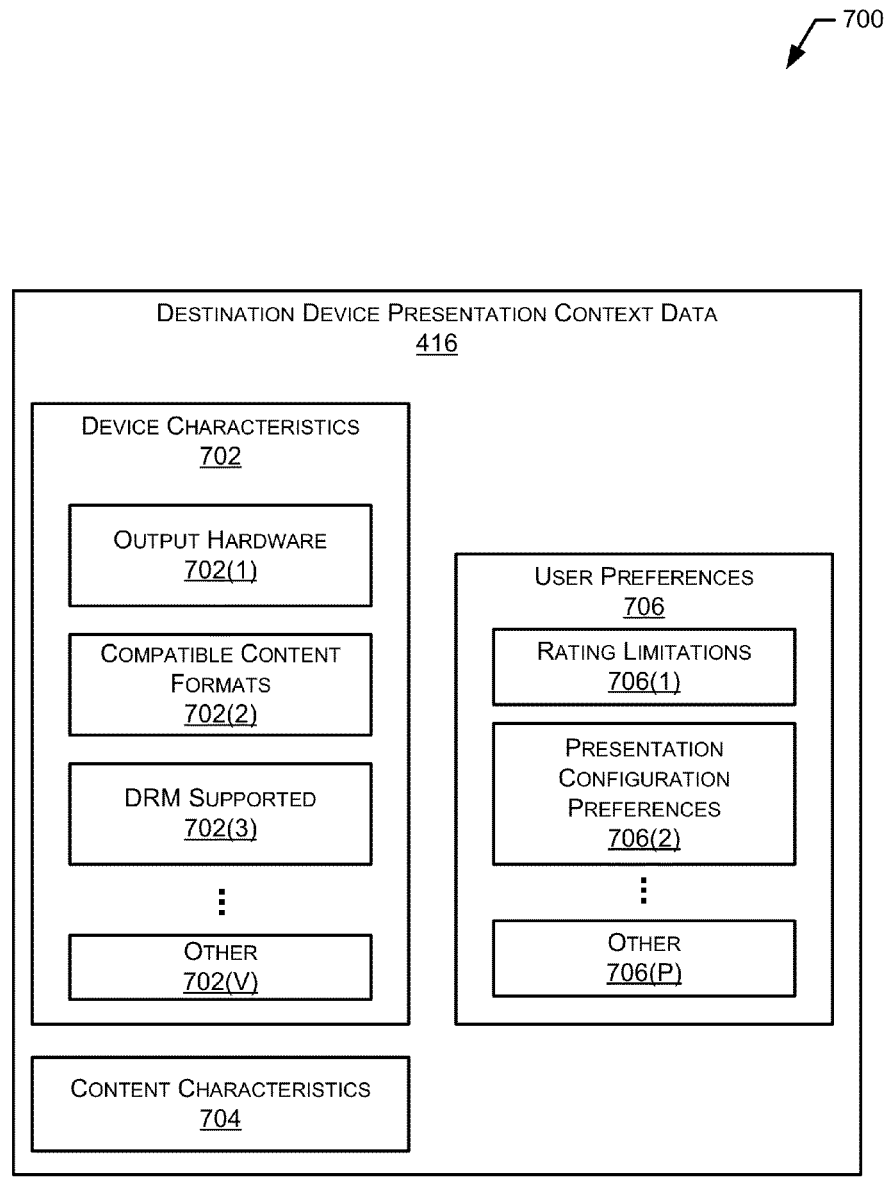
FIG. 7 illustrates a block diagram of destination device presentation context used by the content processing module to generate output content for presentation on the destination device.

FIG. 7 illustrates a block diagram 700 of the destination device context data 416 ("presentation context data 416"). As described above, the content processing module 130 may process the input content 112 to produce output content 132, with the processing based at least in part on the presentation context data 416.

The presentation context data 416 provides information which is indicative of the destination device 134 which is to present the output content 132. By having knowledge of the destination device 134, the content processing module 130 may select processing which is appropriate to the destination device 134, and which will result in the output content 132 being delivered to the destination device 134 which is compatible with, and capable of being presented by, the destination device 134.

The presentation context data 416 may be retrieved from stored data in the datastore 412, acquired from the destination device 132, or from a combination of both. For example, a device identifier associated with the destination device 134 may be used to retrieve previously defined presentation context data 416 about that destination device 134.

The presentation context data 416 may include one or more of device characteristics 702, content characteristics 704, or user preferences 706. The device characteristics 702 provide data indicative of the hardware and software environment available on the destination device 134. This data may include output hardware 702(1), compatible content formats 702(2), digital rights management ("DRM") supported 702(3), and other data 702(V).

The output hardware 702(1) data includes output hardware available for presentation on the destination device 134, such as display resolution, output display color capability information, availability of hardware encoders/decoders, number of audio channels supported, and so forth. The output hardware 720(1) data is indicative of the media output capabilities of the destination device 134. For example, the output hardware 702(1) data may indicate that the destination device 134(1) has a full-color display which supports 1080p video data at 60 frames per second. Using this data, the content processing module 130 may ensure that compatible output content 132 is delivered. For example, the content processing module 130 would avoid attempted presentation of content 112 which is full-motion color video on a black-and-white electrophoretic display with a redraw rate insufficient for video.

The compatible content format data 702(2) comprises information about what formats are accepted by the destination device 134. For example, this may include a listing of formats such as MPEG-2, MP3, H.264, and so forth. In some implementations information about unsupported formats may be provided. By using this information, the content processing module 130 may determine whether transcoding is called for, and what output format to provide the output content 132 in.

The DRM supported data 702(3) indicates what, if any, digital rights management protocols are supported and enforced. For example, the DRM supported data 702(3) may indicate that the destination device 134 is compliant with the Marlin DRM platform created by the Marlin Developer Community. This data may be used to determine whether the device supports the DRM required by the content provider. In some implementations, the content processing module 130 may provide transformation from a first DRM scheme which is incompatible with the destination device 134 to a second DRM scheme which is compatible with the destination device 134.

Other data 702(V) may be provided, such as input hardware which is supported by the destination device 134. For example, some content 112 such as games or interactive television may require input devices such as microphones, touch sensors, and so forth to properly present the content 112.

The content characteristics 704 may include information indicative of the content, content metadata, presentation requirements, and so forth. For example, the content characteristics may indicate that the content comprises video with a multichannel audio track and is a cinematic release. The content processing module 130 may use this information to process the input content 112 such that the output content 132 renders in the best possible fashion available on the destination device 132. Continuing the example, the content processing module 130 may apply psychoacoustic sound localization processing to the audio track to simulate multiple speakers from a single pair of speakers available on the destination device 134.

The user preferences 706 indicate those presentation characteristics which the user 102 has defined or accepted. The user preferences 706 may include one or more of rating limitations 706(1), presentation configuration preferences 706(2), or other preferences 706(P). The rating limitations 706(1) may specify ratings such as those promulgated by the Motion Picture Association of America for which presentation is restricted. For example, the user 102 may set the rating limitation 706(1) to not present content with a restricted "R" rating or higher.

The presentation configuration preferences 706(2) indicate particular user settings such as audio equalizer settings, color balance preferences, and so forth. For example, the user 102 may configure the presentation configuration preferences 706 (2) such that when the content characteristics 704 indicate the content 112 to be presented is a cinematic release, that cinematic image settings be selected on the destination device 134, with the cinematic image settings comprising pre-determined color balance and brightness settings.

Other user preferences 706(P) may also be specified. For example, the user may specify that content which is to be rendered using a text-to-speech module should be provided with a contralto voice.

Illustrative Processes of Content Delivery

Figure 8:
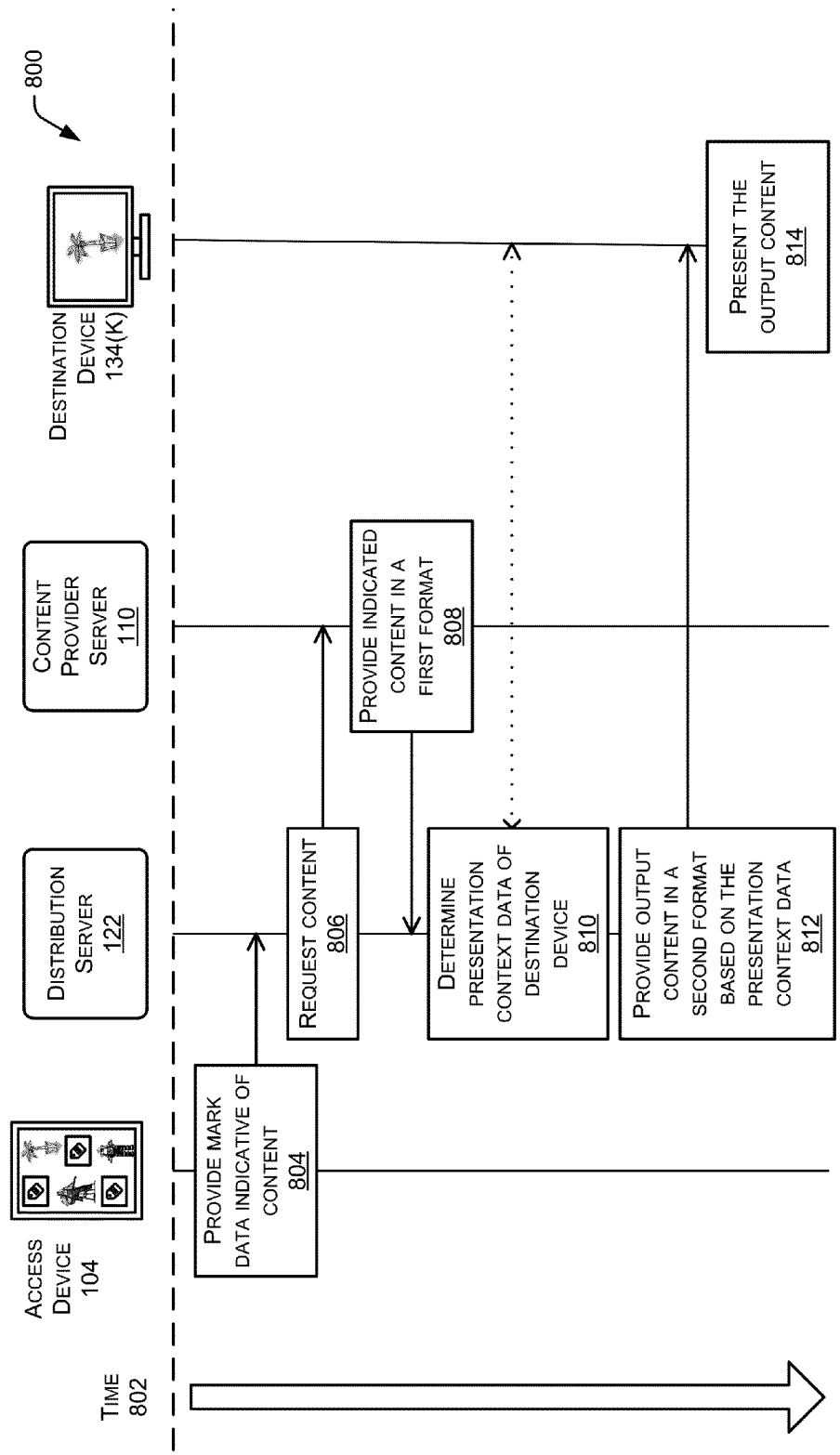
FIG. 8 illustrates a flow diagram of the interactions between the access device, the distribution server, the content provider server, and the destination device while providing content for presentation on the destination device.

FIG. 8 illustrates a flow diagram 800 of the interactions between the access device 104, the distribution server 122, the content provider server 110, and the destination device 134 while providing content for presentation on the destination device. In this illustration, time increases down the page, as indicated by arrow 802, such that operations of blocks at the top of the page may occur before operations of blocks at the bottom of the page.

Block 804 provides the mark data 120 indicate of content 112 which the user 102 wishes to add to the consolidated content list data 414, present on a destination device 134, or both. For example, the bookmarklet control 118 may generate the mark data 120 on the access device 104.

At the distribution server 112, block 806 requests the content 112 from the content provider 110. In some implementations this request may include information indicative of the user account associated with the user 102 which has initiated the mark data 120.

At the content provider server 110, block 808 provides the indicated content 112 in a first format. For example, the content provider server 110 may deliver the content 112(1) in the MPEG-4 format.

In some implementations, the distribution server 122 may use block 810 to determine the presentation context data 416 of the destination device 134. For example, the distribution server 122 may query the destination device 134 to retrieve the presentation context data 416 indicating that presentation of MPEG-2 formatted content is supported. In some implementation the order of blocks 806 and 810 may be reversed.

Block 812 at the distribution server 122 provides output content 132 in a second format based at least in part on the presentation context data 416. For example, the input content 112 in the MPEG-4 format may be transcoded to the MPEG-2 format and sent to the destination device 134.

Block 814 causes the destination device 134 to present the output content 132. In some implementations instructions may be sent to the destination device 134 which, when executed by a processor of the destination device 134, instruct the destination device 134 to begin presentation of the output content 134. In a further implementation, the destination device 134 may be configured to present a prompt requesting user approval to present the output content 132. For example, a display on the destination device 134 may be configured to ask "do you want to watch this content?" and accept input from a remote control. Responsive to receiving data indicative of acceptance, the distribution server 122 may provide the output content 132 for presentation.

Figure 9:
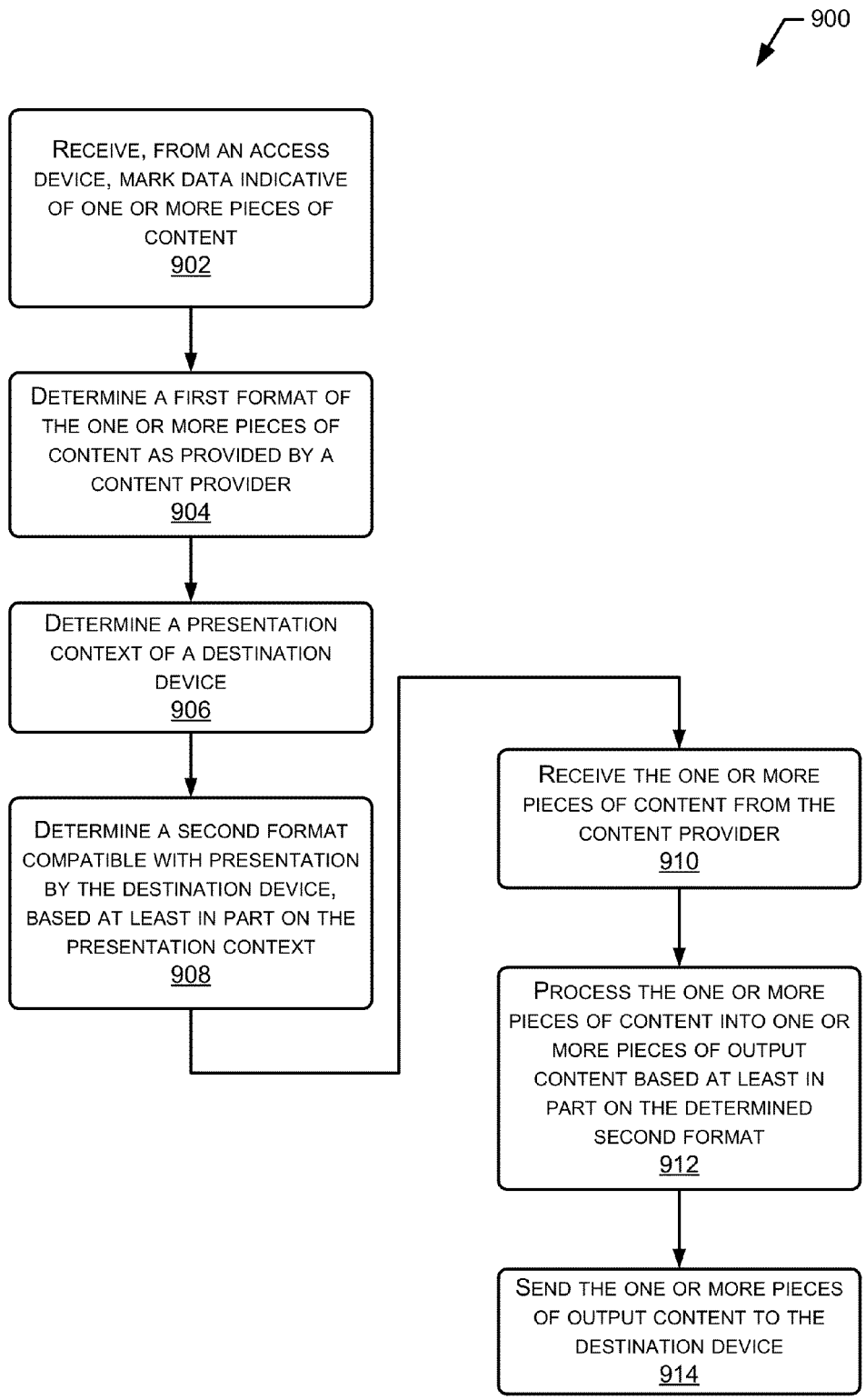
FIG. 9 illustrates a flow diagram of providing output content to a destination device.

FIG. 9 illustrates a flow diagram 900 of generating and providing the output content 132 to the destination device 134. The process may be implemented at least in part by the distribution server 122 and the modules therein.

Block 902 receives from a first device, such as the access device 104, data indicative of content 112 available from the content provider 110 for presentation. The access device 104 may comprise a portable computing device such as a tablet computer, smartphone, laptop, in-vehicle entertainment system, and so forth. For example, the mark management module 124 may receive the mark data 120 from the access device 104. The data, such as the mark data 120, may be generated at least in part by a script executing on the access device 104. For example, the bookmarklet control 118 may utilize a bookmarklet script activated within a web browser engine executing on the access device 104 to generate and send the mark data 120 associated with the content 112. As described above, the content 112 may comprise one or more of audio data, electronic book data, video data, or still image data.

Block 904 determines a first format of the content 112 as available from the content provider 110 for presentation. For example, the content processing module 130 may determine the input content 112 is in an MPEG-4 format. This determination may be made based in part on content metadata associated with the content 112, an analysis of the content 112 as delivered to the content processing module 130, and so forth.

Block 906 determines a presentation context of the destination device 134. As described above, in one implementation, the distribution server 122 may send a request for presentation context data 416 to the destination device 134, and may then receive the requested presentation context data 416 from the destination device. The presentation context data 416 is described above in more detail with regard to FIG. 7.

As described also above, in another implementation the distribution server 122 may lookup presentation context data 416 associated with the destination device 134. In this implementation, the mark data 120 generated at least in part by the script executing on the access device 104 may include device identification data indicative of one or more of a manufacturer, make, or model of the access device 104. The presentation context data 416 may be retrieved from a list of the one or more content formats compatible with presentation on the destination device 134 based at least in part on the device identification data. Other presentation context data 416 may be retrieved in this fashion as well.

In yet another implementation, the mark data 120 may include the presentation context data 416. For example, the mark data 120 may include one or more of the device characteristics 702, the content characteristics 704, or the user preferences 706.

Block 908 determines a second format compatible for presentation of the content with a second or destination device 134. As described above, the determination may be based at least in part on the presentation context data 416 of the destination device 134. As also described above, the presentation context data 416 comprises information indicative of one or more content formats compatible with presentation on the destination device 134. The presentation context data 416 may include information indicative of the one or more media output capabilities of the second device. For example, that the destination device 134 supports 1080p video with a hardware-based MPEG-4 decoder.

Block 910 receives at least a portion of the one or more pieces of content 112 from the content provider 110 in the first format. For example, the distribution server 122 may send a request for data using account information associated with the user account of the user 102, which results in the content provider server 110 sending the input content 112. This retrieval may be based at least in part on the device identification.

Block 912 processes the one or more pieces of content 112 into one or more pieces of output content 132 based at least in part on the determined second format. For example, the input content 112 in the MPEG-4 format may be transcoded to the MPEG-2 format suitable for presentation on the destination device 134(1).

As describe above, the processing may include transcoding the received at least a portion of the content 112 from the first format into a second format compatible with the presentation context of the destination device 134. The processing may include the other operations discussed above, including but not limited to transsrating, transsizing, decrypting, and so forth.

In one implementation the processing may include determination of a portion of the content 112 supported by the presentation context of the destination device 134. For example, the presentation context data 416 may indicate the destination device 134 is capable of audio output. The processing may further determine a portion of the content 114 unsupported by the presentation context of the destination device 134. For example, the destination device 134 may lack a display for presenting video output. The processing may then comprise modification of the output content 132 to comprise the portion of the content 112 supported by the presentation context while discarding the portion of the content unsupported by the presentation context. For example, the output content 132 may comprise only the audio portion of the content 112 and omitting the video portion.

Block 914 sends at least a portion of the processed output content 132 to the destination device 134. For example, the transcoded content in the second format may be sent using the network to the second destination device 134. In one implementation the mark data 120 may include data indicative of the particular destination device(s) 134. In this implementation, the sending may be based at least in part on the designation.

Figure 10:
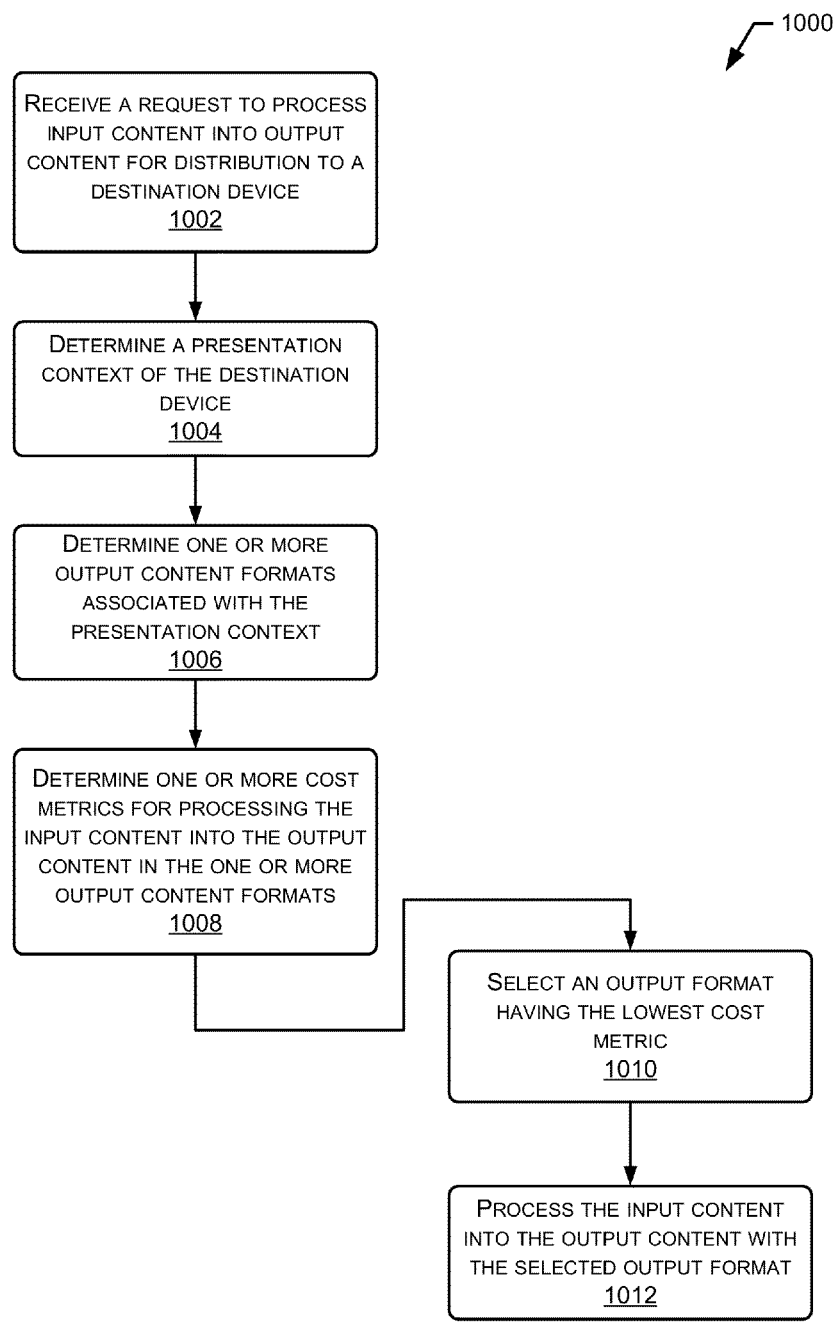
FIG. 10 illustrates a flow diagram of generating the output content based at least in part on one or more cost metrics.

FIG. 10 illustrates a flow diagram 1000 of generating the output content 132 based at least in part on one or more cost metrics. The process may be implemented at least in part by the distribution server 122 and the modules therein. In some implementations it may be advantageous to adjust the processing applied to the input content 112 based on costs associated with the processing.

Block 1002 receives a request to process input content 112 into output content 132 for distribution to the destination device 134. Block 1004 determines the presentation context data of 416 the destination device 1004.

Block 1006 determines one or more output content formats associated with the presentation context data 416. In one implementation, block 1006 may determine a plurality of available formats associated with the presentation context of the destination device 134. For example, the destination device 134 may be compatible with presenting content using the MPEG-4 format and a "Proprietary X" format.

Block 1008 determines, based on one or more cost metrics, a cost for processing at least a portion of the content 112 into the one or more available formats. For example, the content processing module 130 may determine that there is a financial cost of $0.04 associated with providing the output content 134 in the MPEG-4 output format and $0.27 associated with providing the output content in 134 in the "Proprietary X" output format.

The cost metrics may include one or more of license fees associated with the processing, estimated processor resources used for the processing, current system load, estimated memory usage for the processing, DRM translation fees, perceived quality of the output by the user 102, fidelity of the processing, and so forth. These costs may be assessed in monetary units such as dollars, functional units such as number of processor cycles or bytes of memory consumed, or a combination thereof.

Block 1010 selects the output format from the plurality of available formats based at least in part on the one or more cost metrics. In one implementation, the format having the lowest cost may be selected. For example, the MPEG-4 format may be selected due to the lower cost. Selection criteria may be designated globally across all users 102, by groups of users 102, or by individual users 102. For example, the user 102(1) may choose to have processing which always results in highest fidelity of content presented regardless of the cost, while the user 102(2) may choose to always have the least expensive.

Block 1012 processes the input content 112 into the output content 134 using the selected output format. The content processing module 130 may generate the output content 132 in the MPEG-4 format.

Figure 11:
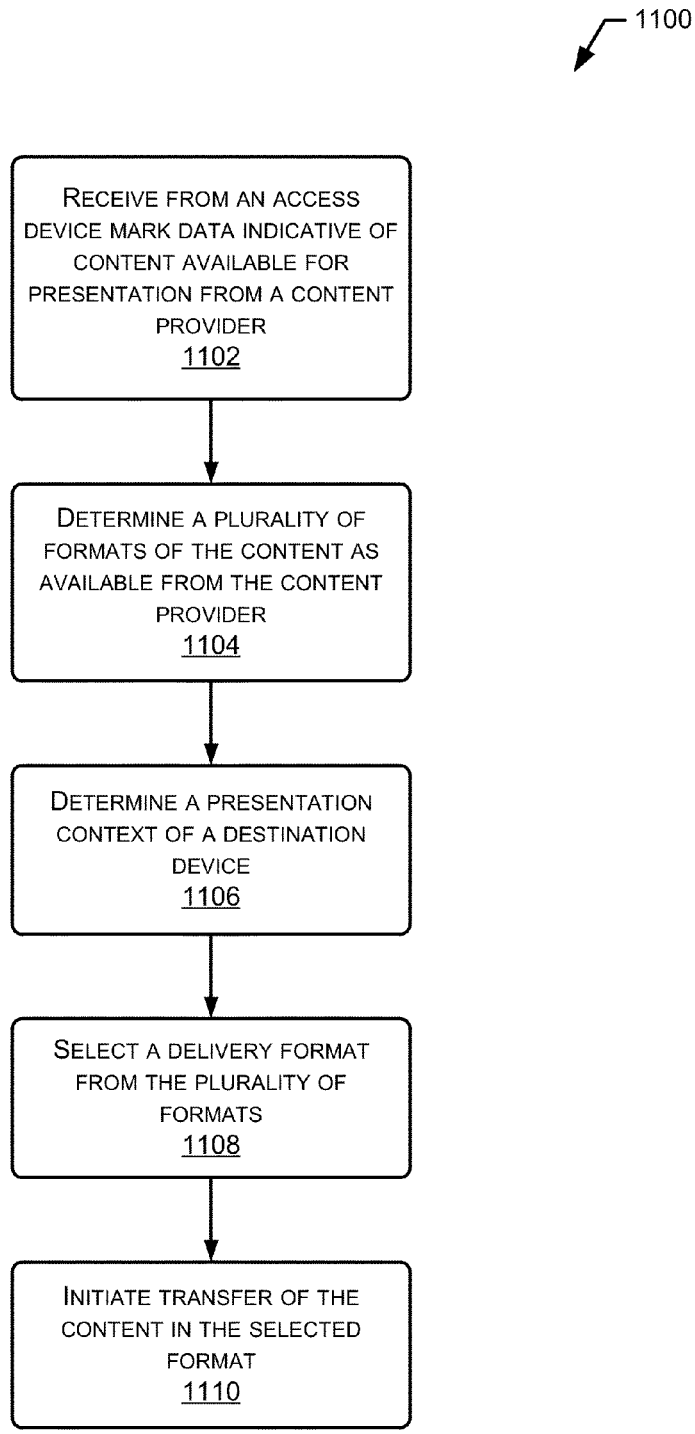
FIG. 11 illustrates a flow diagram of determining a presentation context of a destination device and initiating delivery of content to that destination device.

FIG. 11 illustrates a flow diagram 1100 of determining a presentation context of a destination device and initiating delivery of content to that destination device. The process may be implemented at least in part by the distribution server 122 and the modules therein.

Block 1102 receives from the access device 104 data indicative of content 112 available from a content provider 110 for presentation. For example, the user 102 may activate the bookmarklet control 118 of the access device 104 to generate mark data 120.

As described above, the mark data 120 may designate the destination device 134. This designation indicates what device the content provider server 110 will be requested to transfer content 112 to, as described below.

Block 1104 determines a plurality of formats of the content 112 as available from the content provider. For example, the content provider may have available for distribution from the content provider server 110 the content 112 in the MPEG-2 and MPEG-4 formats.

Block 1106 determines the presentation context of the destination device 134. As described above, the presentation context data 416 is indicative of presentation capabilities of the destination device 134 for presentation on the destination device 134.

Block 1108 selects a delivery format from the plurality of formats of the content 112 as available from the content provider. The delivery format is selected which is operable with the presentation context of the destination device 134. For example, where the destination device 134 only supports the MPEG-2 format, the MPEG-2 format would be selected for delivery.

Block 1110 initiates transfer of the content 112 in the selected format between the content provider server 110 and the destination device 112. In one implementation the initiation of transfer of the content 112 may comprise sending to the content provider server 110 data configured to initiate transmission of the content in the delivery format to the destination device 134. For example, XML data may be provided indicating user account credentials associated with the user, content identifier, format requested, and destination device address.

In another implementation, the initiation of the transfer of the content 112 may comprise sending the destination device 134 data configured to initiate transmission of the content 112. This data may be configured to initiate the transmission in the desired delivery format from the content provider server 110 to the destination device 134. For example, a script or link may be provided to the destination device 134, which when processed by a rendering engine establishes the connection with the designated content provider server 110 and requests the content 112 for presentation.

As described above with regard to FIG. 10, the selection of the delivery format may be further based at least in part on one or more of available bandwidth between the destination device 134 and the content provider server 110, or financial costs associated with transferring the content 112 using the plurality of available formats.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method comprising:
receiving, from a first device, data indicative of content available from a content provider for presentation;
determining a plurality of content formats of the content as available from the content provider;
determining a presentation context of a second device, wherein the presentation context is indicative of one or more of:
media output capabilities of the second device,
support for digital rights management on the second device, or
user preferences associated with presentation of content by the second device;
based on one or more cost metrics, determining a cost for processing the at least a portion of the content into each of the plurality of content formats, the one or more cost metrics comprising a respective license fee associated with each of the plurality of content formats; and
selecting a delivery format from the plurality of content formats based at least in part on the one or more cost metrics and compatibility with the presentation context of the second device; and
initiating transfer of the content in the selected delivery format between the content provider and the second device.

2. The method of claim 1, further comprising receiving, from the first device, data designating the second device for transfer of the content from the content provider.

3. The method of claim 1, the initiating transfer of the content comprising sending, to the content provider, data configured to initiate transmission of the content in the delivery format to the second device.

4. The method of claim 1, the initiating transfer of the content comprising sending, to the second device, data configured to initiate transmission of the content in the delivery format from the content provider to the second device.

5. The method of claim 1, the selecting the delivery format further based at least in part on available bandwidth between the second device and the content provider.

6. A computer-implemented method comprising:
receiving, from a first device, data indicative of content available from a content provider for presentation;
determining a first format of the content as available from the content provider;
determining a presentation context of a second device, wherein the presentation context is indicative of one or more media output capabilities of the second device;
receiving from the content provider at least a portion of the content in the first format;
processing, based at least in part on the presentation context, the received at least a portion of the content from the first format into output content having a second format, wherein the second format is compatible with the presentation context of the second device, wherein the processing comprises:
determining a first portion of the content supported by the one or more media output capabilities of the second device;
determining a second portion of the content unsupported by the one or more media output capabilities of the second device;
discarding the second portion of the content unsupported by the one or more media output capabilities of the second device from the output content; and
sending the output content to the second device using a network interface, wherein the output content omits the second portion of the content.

7. The method of claim 6, further comprising:
based at least in part on the data indicative of content from the content provider, adding the content and data indicative of the content provider of the content to a content list; and
wherein the retrieving at least a portion of the content from the content provider is based at least in part on user input associated with selection of content from the content list.

8. The method of claim 6, further comprising receiving, from the first device, data designating the second device for the sending the output content.

9. The method of claim 6, wherein the data indicative of the content is generated by execution of a script by a browser executing on the first device.

10. The method of claim 6, wherein the processing comprises one or more of:
transcoding the content from a first encoding scheme of the first format to a second encoding scheme of the second format;
transrating the content from a first bit rate of the first format to a second bit rate of the second format which is lower than the first bit rate; or
transsizing the content from a first image size of the first format to a second image size of the second format.

11. The method of claim 6, further comprising:
storing the data indicative of content in a content list after receiving the data indicative of content from the first device;
sending at least a portion of the content list to the first device or the second device for presentation;
receiving from the first device or the second device an indication of selection for presentation content indicated in the content list; and
wherein the retrieving, processing, and sending is based at least in part on the indication of selection.

12. The method of claim 6, wherein the content in the first format comprises data including audio and video and the content in the second format comprises data including audio or video.

13. The method of claim 6, wherein the presentation context is further indicative of one or more user preferences associated with presentation.

14. The method of claim 6, wherein the first device comprises one or more of a television, a set-top box, a tablet computer, a smartphone, an in-vehicle entertainment system, a laptop computer, or a desktop computer.

15. The method of claim 6, wherein the second device comprises one or more of a television, a set-top box, a tablet computer, a smartphone, an in-vehicle entertainment system, a laptop computer, or a desktop computer.

16. The method of claim 6, further comprising:
   determining a plurality of available formats associated with the presentation context of the second device;
   based on one or more cost metrics, determining a cost for processing the at least a portion of the content into the plurality of available formats; and
   selecting the second format from the plurality of available formats based at least in part on the one or more cost metrics.

17. The method of claim 16, wherein the one or more cost metrics include:
   a license fee associated with the processing,
   estimated processor resources used for the processing,
   current system load, or
   estimated memory usage for the processing.

18. A system, comprising:
   a network interface configured to couple to a network;
   at least one memory storing computer-executable instructions; and
   at least one processor configured to couple to the network interface and access the at least one memory and execute the computer-executable instructions to:
      receive, from a portable computing device, data indicative of content available from a content provider for presentation, wherein the data is generated at least in part by a script executing on the portable computing device, wherein the data comprises presentation context data associated with a second device, the presentation context data comprising content formats compatible with presentation on the second device;
      determine a first format of the content available from the content provider;
      determine a second format compatible with presentation on the second device, the determination comprising retrieving, based at least in part on the presentation context data, the second format from a list of the content formats compatible for presentation with the second device;
      receive at least a portion of the content from the content provider in the first format;
      convert the received at least a portion of the content from the first format into the second format; and
      send at least a portion of the converted content in the second format to the second device.

19. The system of claim 18, wherein the content comprises one or more of audio data, electronic book data, video data, or still image data.

20. The system of claim 18, wherein the determination that the second format is compatible with presentation on the second device comprises instructions to:
   send a request for presentation context data to the second device;
   receive the requested presentation context data from the second device.

21. The system of claim 18, the presentation context further comprising data indicative of one or more of:
   output hardware available for presentation on the second device,
   support for digital rights management on the second device,
   content characteristics comprising content metadata associated with the content, or
   user preferences associated with presentation.

* * * * *